US005516044A

United States Patent [19]
Thorstensson

[11] Patent Number: 5,516,044
[45] Date of Patent: May 14, 1996

[54] DROP NOZZLE SYSTEM AND HOLDER MOUNT THEREFOR

[75] Inventor: Ulf S. Thorstensson, Davenport, Iowa

[73] Assignee: Hardi, Inc., Davenport, Iowa

[21] Appl. No.: 264,018

[22] Filed: Jun. 22, 1994

[51] Int. Cl.⁶ .................................................... B05B 1/20
[52] U.S. Cl. ......................................... 239/159; 239/176
[58] Field of Search ..................................... 239/172, 162, 239/163, 166–8, 176, 159; 248/225.1, 225.2; 47/1.7; 285/61; 403/321, 338, 335, 353

[56] References Cited

U.S. PATENT DOCUMENTS

| | | | |
|---|---|---|---|
| 1,327,441 | 1/1920 | Mesker et al. | 403/321 |
| 1,583,619 | 5/1926 | Splittstoser | 239/168 |
| 3,117,725 | 1/1964 | Palmer | 239/162 |
| 3,128,845 | 4/1964 | Parker | 403/353 |
| 3,894,316 | 7/1975 | Johnson | 403/338 |
| 3,970,304 | 7/1976 | Ebstein et al. | 248/225.1 X |
| 4,759,177 | 7/1988 | Brazell | 403/321 X |
| 4,816,205 | 3/1989 | Gallix | 248/225.2 X |
| 5,326,030 | 7/1994 | Benest | 239/164 |

OTHER PUBLICATIONS

Brochure entitled "Trailer Sprayers", published by Hardi, Inc. ©Hardi 1992.

*Primary Examiner*—Andres Kashnikow
*Assistant Examiner*—Lisa Douglas

[57] ABSTRACT

A drop nozzle system on an agricultural vehicle such as a sprayer unit includes a plurality of mounting plates attached in a spaced manner to a trailing boom structure. A plurality of drop nozzle assemblies each coupled by suitable hosing to the nozzle bodies on an agricultural spray boom are adapted for secure attachment to the mounting plates. With the mounting plates attached to the boom structure at predetermined, standard row spacings such as 30", 34", 36", 38", etc., the drop nozzle assemblies may be attached to the appropriately spaced mounting plates as determined by the inter-row spacing of the field to be sprayed. Attachment of each nozzle assembly to a respective mounting plate employs a quick disconnect coupling arrangement which facilitates re-configuring the drop nozzle system for various inter-row spacings. The quick disconnect coupling arrangement also facilitates vertical adjustment of the individual drop nozzle assemblies depending upon crop height, while the possibility of damage to the nozzle structure caused by impact of a drop nozzle assembly with an obstruction is reduced by attaching the drop nozzle structure directly to the boom structure.

15 Claims, 3 Drawing Sheets

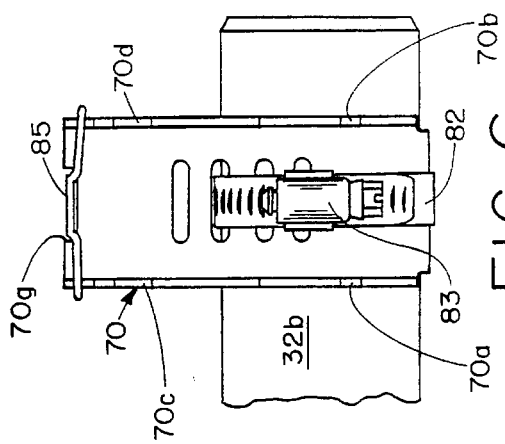
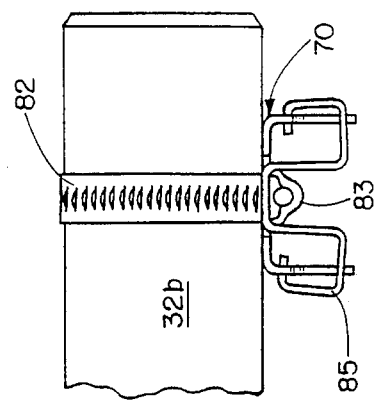
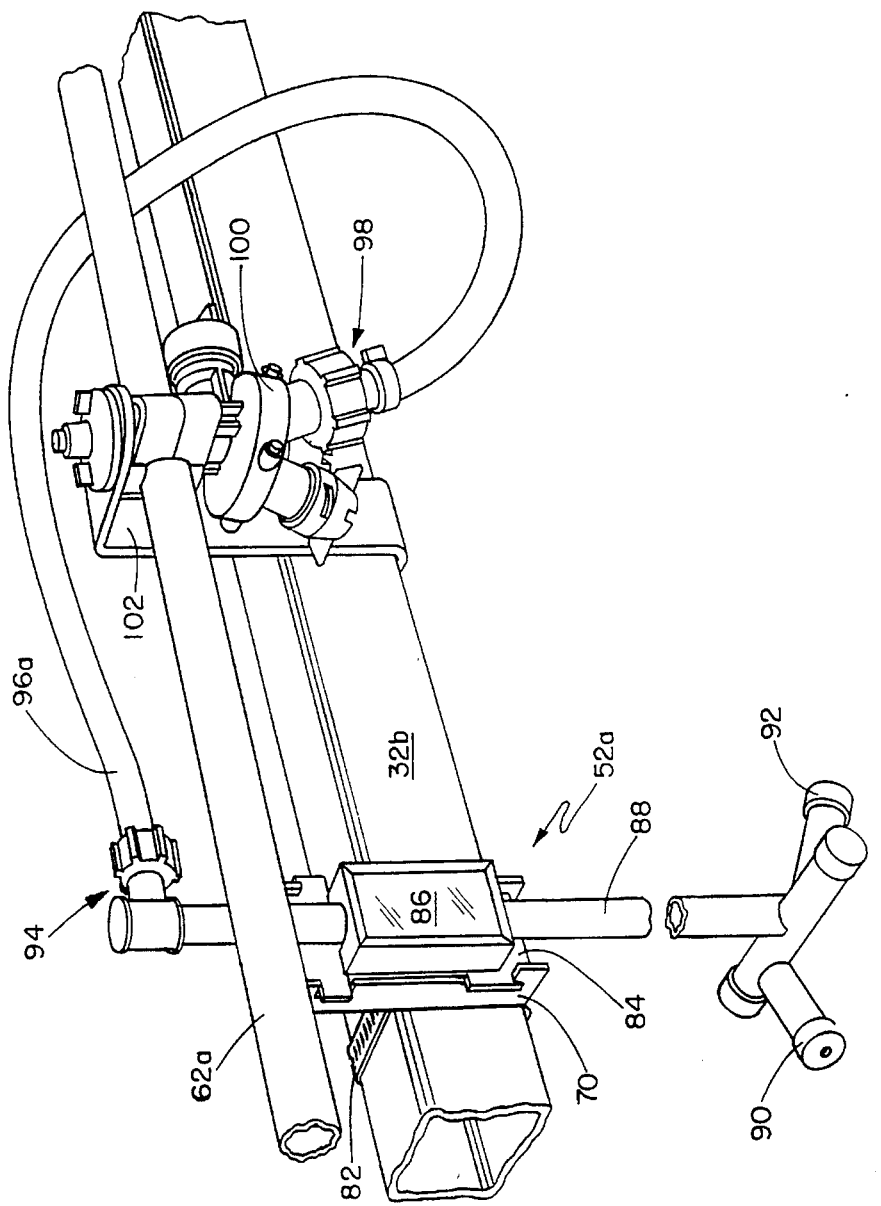

DROP NOZZLE SYSTEM AND HOLDER MOUNT THEREFOR

FIELD OF THE INVENTION

This invention relates generally to agricultural crop sprayers and is particularly directed to a drop nozzle system such as used in spraying the lower portion of plants arranged in rows.

BACKGROUND OF THE INVENTION

Drop nozzles are used with row crops where it is necessary to spray the lower portion of the plant with a herbicide or insecticide. A number of individual nozzle assemblies are mounted in a spaced manner along the length of a boom structure attached to an agricultural sprayer vehicle, with the nozzles disposed intermediate adjacent crop rows. Each drop nozzle assembly includes an elongated, vertically oriented tube attached at its upper end to the boom-mounted drop nozzle bracket and having one or more spray nozzles at its lower end. The nozzle assembly tube must be long enough to provide spraying access to a lower portion of the plants, while allowing the boom to pass over the crop rows which may be varying in length from one to several feet depending on the crop. Not only does the height of the crop vary depending on the type of crop, but as the growing season progresses the height of the crop also increases under normal conditions. Moreover, crop row spacing generally varies between different types of crops and even from field to field for the same types of crops.

A drop nozzle assembly is typically mounted to the spraying vehicle's boom by means of a threaded U-clamp, or directly attached to the nozzle bodies on the boom. In case of the U-bolt design, moving the individual nozzle assemblies to accommodate the change in crop row spacing involves loosening two nuts from the clamp, removing the clamp from the boom, and relocating the mounting clamp on the boom. The nozzle assembly cannot simply be slid along the boom following loosening of the U-clamp to a new position on the boom because of the presence of trusses and other structures along the length of the boom. The U-clamps employed are typically of a relatively large size and have extended threaded shafts to accommodate a range of boom sizes and shapes, making nozzle assembly removal time consuming and tedious. In the case where the drop nozzles are attached directly to one of the permanent nozzle holders on the boom, there is not only a need for a large number of nozzle holders to accomodate for different row spacing, but there is also a substantial risk of damaging the permanent nozzle holder if the attached drop nozzle should encounter an obstacle. In the case of a custom sprayer who may operate on a large number of different fields each day, changing the position of the nozzle assemblies along the length of the boom becomes impractical and attaching nozzle assemblies for every possible row crop spacing is economically prohibitive.

The present invention addresses the aforementioned limitations of the prior art by providing a drop nozzle system and a quick disconnect holder mount therefor which employs a plurality of sets of mounting plates attached in a spaced manner along the length of the sprayer boom, where each set of mounting plates is adapted to accommodate a given inter-row crop spacing. The quick disconnect holder mount permits each drop nozzle assembly to be quickly and easily removed from a mounting plate of a first set and attached to a mounting plate of a second set to accommodate a change in crop row spacing. The use of a "jumper hose" further allows the operator to connect the drop nozzle to the closest existing nozzle holder rather then attaching to a special nozzle holder that lines up with the row.

OBJECTS AND SUMMARY OF THE INVENTION

Accordingly, it is an object of the present invention to provide a drop nozzle system for use in spraying the lower portion of crops arranged in rows which is adapted for accommodating a range of inter-row spacing.

It is another object of the present invention to provide a quick disconnect coupling arrangement for mounting a drop nozzle assembly to the boom of an agricultural sprayer unit.

These objects of the present invention are achieved and the disadvantages of the prior art are eliminated by an apparatus mounted to a boom of an agricultural sprayer and coupled via hosing to existing nozzle holders of the sprayer for spraying row crops, the apparatus comprising: a plurality of drop nozzle assemblies each coupled to the nozzle holders; a plurality of mounting brackets securely attached in a spaced manner to the boom and arranged in a plurality of sets of mounting brackets on the boom, where the spacing between adjacent mounting brackets in each set of mounting brackets corresponds with a predetermined, fixed inter-row spacing of the crops; and quick disconnect arrangement for coupling each of the drop nozzle assemblies to the mounting brackets in a respective set of mounting brackets in accordance with the inter-row spacing of the crops being sprayed.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2 is a partial perspective view of a drop nozzle and sprayer assembly combination attached to a sprayer boom in accordance with the present invention;

FIGS. 6 and 7 are respectively front elevation and top plan views of a quick disconnect drop nozzle mounting bracket attached to the boom of an agricultural sprayer unit.

DETAILED DESCRIPTION OF THE PREFERRED EMBODIMENT

Agricultural sprayers are typically arranged to provide "broad" spraying of the crop where the individual nozzles are mounted directly to the sprayer's boom in a spaced manner. In this application, the nozzles do not have to be aligned with the crop rows because the entire crop is sprayed. Normal nozzle spacing for broad spraying is from 20" to 30" along the entire length of the boom starting 10"

to 15" from the center of the boom, with 20" spacing used most commonly. In drop nozzle spraying, the nozzles must be positioned in the inter-row spaces. This invention facilitates re-configuring the agricultrual crop sprayer from a broad spraying application to a spraying arrangement employing drop nozzles.

Figure 1:
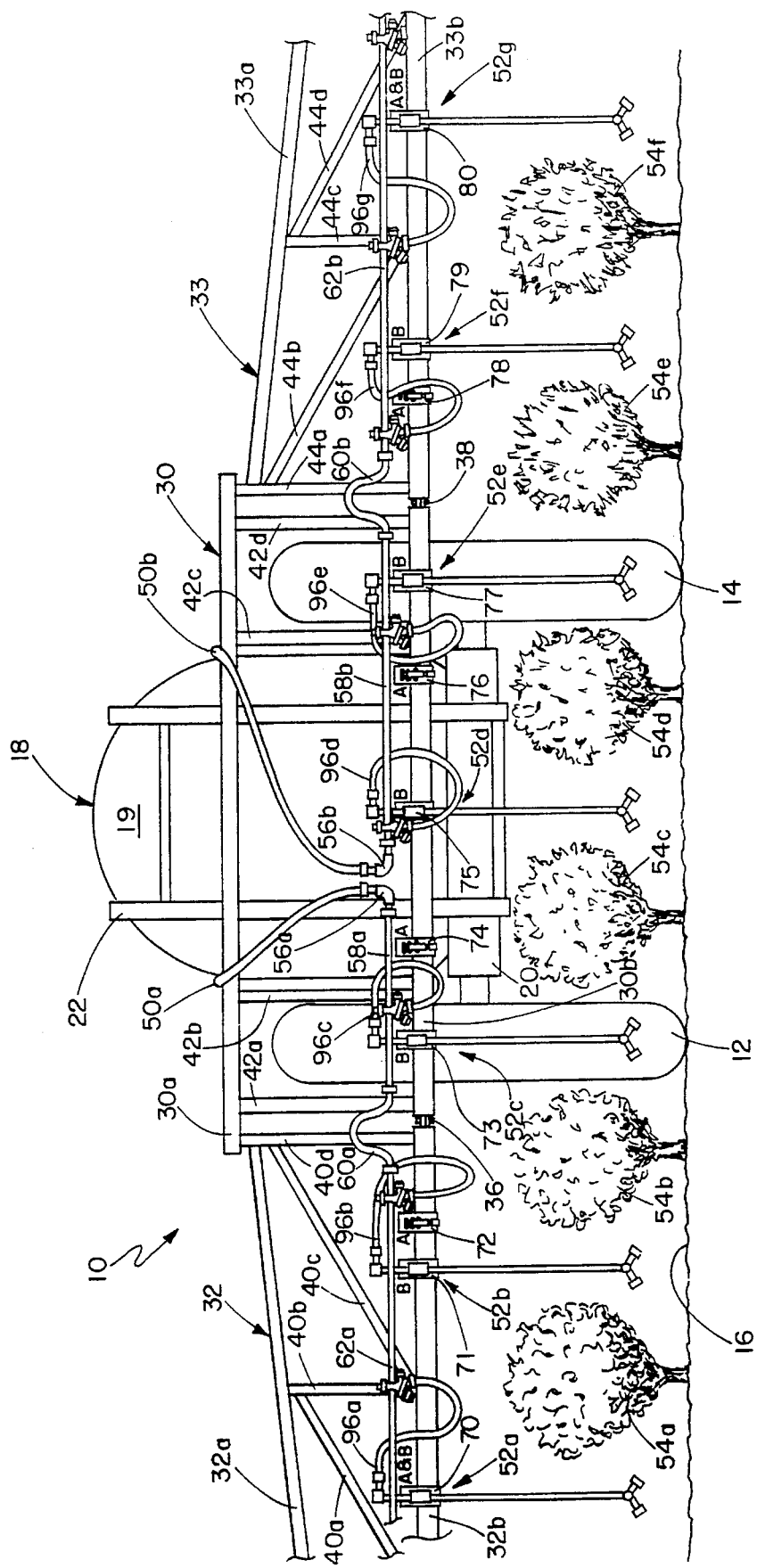
FIG. 1 is a partial aft elevation view of a boom structure coupled to an agricultural vehicle and incorporating a drop nozzle system in accordance with the principles of the present invention.

Referring to FIG. 1, there is shown an aft elevation view of a drop nozzle system 10 mounted to the boom structure of an agricultural vehicle 18 in accordance with the principles of the present invention. Agricultural vehicle 18 is adapted for towing by a tractor which is not shown in the figure for simplicity. Agricultural vehicle 18 includes a support frame 20 to which is mounted a tank 19 containing a fluid such as an insecticide, fungicide or herbicide for application to a plurality of spaced crop rows 54a–54f. Agricultural vehicle 18 further includes first and second wheels 12 and 14 to facilitate towing by a tractor. Mounted to an aft portion of the agricultural vehicle 18 is an H-frame 22 to which is attached the aforementioned boom structure which is described in detail in the following paragraphs. Conventional means may be used to attach the boom structure to the H-frame 22 such as coupling brackets and nut and bolt combinations which are also not shown in the figure for simplicity.

The boom structure includes a boom center frame 30 and first and second boom outer frames 32 and 33. Center frame 30 includes an upper support bar 30a and a lower support bar 30b which are attached in a spaced manner to the aft H-frame 22 and are aligned generally parallel with the surface of the ground 16. The first boom outer frame 32 is pivotally coupled to the center frame 30 by means of a first hinge 36, while the second outer frame 33 is pivotally coupled to the center frame by means of a second hinge 38. The pivoting coupling between the center frame 30 and the first and second outer frames 32, 33 permits the outer frames to be moved between an extended, use position as shown in FIG. 1 and a retracted, folded position for transport and storage. The boom center frame 30 further includes a plurality of spaced vertical members 42a–42d extending between and coupled to the upper support bar 30a and the lower support bar 30b to provide the center frame with the high degree of strength and rigidity.

The first boom outer frame 32 includes an upper support bar 32a and a lower support bar 32b. Attached to and extending between the upper and lower support bars 32a, 32b are a plurality of trusses 40a–40d. Similarly, the second boom outer frame 33 includes an upper support bar 33a and a lower support bar 33b, with a plurality of trusses 44a–44d coupled to and extending between the upper and lower support bars.

In accordance with the present invention, a plurality of sets of mounting brackets are disposed in a spaced manner along the length of the boom structure. Thus, attached to the lower support bar 32b of the first boom outer frame 32 are mounting brackets 70 and 71. Similarly, attached in a spaced manner along the length of the center frame's lower support bar 30b in a spaced manner are a plurality of mounting brackets 73, 74, 75, 76 and 77. Finally, attached in a spaced manner to the lower support bar 33b of the second boom outer frame 33 are mounting brackets 79 and 80. Mounting brackets 70, 72, 74, 76, 78 and 80 comprise a first set "A" of mounting brackets, while mounting brackets 70, 71, 73, 75, 77, 79 and 80 comprise a second set "B" of mounting brackets. Thus, the two end mounting brackets 70 and 80 shown in the figure are members of set A as well as set B. Additional mounting brackets are attached to the more outboard portions of the first and second boom outer frames 32, 33, although these additional mounting brackets are not shown in the figure for simplicity. The two sets of mounting brackets are defined in terms of the inter-bracket spacing along the boom structure. Thus, the spacing between mounting brackets in set A is a first fixed distance, while the spacing between mounting brackets in set B is a second, shorter distance. In the present embodiment, the inter-bracket spacing for the set B of mounting brackets is 30", while the inter-bracket spacing for the set A of mounting brackets is 36" as shown in the figure. The present invention is not limited to the two aforementioned inter-mounting bracket spacings, as these two spacing distances were selected as representative of conventional inter-crop row spacing distances. The present invention is also not limited to two sets of mounting brackets, as a set of mounting brackets may be provided for virtually any inter-crop row spacing distance.

A spraying system coupled to the vehicle's tank 19 and mounted to and supported by the boom structure includes first and second hoses 50a and 50b extending rearward from the tank. The first hose 50a is coupled to a first center frame hose 58a by means of a first coupler 56a. Similarly, the second hose 50b is coupled to a second center frame hose 58b by means of a second coupler 56b. A first jumper hose 60a couples the first center frame hose 58a to a first outer frame hose 62a mounted to the first boom outer frame 32. Similarly, a second jumper hose 60b connects the second center frame hose 58b to a second outer frame hose 62b mounted to the second outer frame 33.

Coupled to the first outer frame hose 62a by means of respective jumper hoses 96a and 96b are drop nozzles 52a and 52b. Drop nozzles 52a and 52b are respectively attached to boom mounting brackets 70 and 71 which, in turn, are mounted to the first boom outer frame 32. Drop nozzle 52c is attached to boom mounting bracket 73 which is affixed to the boom center frame 30. Jumper hose 96c couples drop nozzle 52c to the first center frame hose 58a. These jumper hoses allow each drop nozzle to be attached to two or more mounting brackets attached to the boom frame depending upon the crop row spacing. For example, jumper hose 96b permits drop nozzle 52b to be attached to either mounting bracket 71 or mounting bracket 72 or to another adjacent mounting bracket. Similarly, jumper hose 96c permits drop nozzle 52c to be attached to mounting bracket 73 or mounting bracket 74 or to another adjacent mounting bracket.

On the other side of the boom structure, drop nozzle 52d is attached to mounting bracket 75 and is coupled to the second center frame hose 58b by means of jumper hose 96d. Drop nozzle 52e is attached to mounting bracket 77 and is coupled by means of jumper hose 96e to the second center frame hose 58b. Drop nozzle 52f is attached to mounting bracket 79 and is connected to the second outer frame hose 62b by means of jumper hose 96f, while drop nozzle 52g is attached to mounting bracket 80 and is connected to the second outer frame hose 62b by means of jumper hose 96g. Jumper hose 96d permits drop nozzle 52d to be attached to either mounting bracket 75 or mounting bracket 76, while jumper hose 96e permits drop nozzle 52e to be attached to either mounting bracket 76 or mounting bracket 77. Similarly, jumper hose 96f permits drop nozzle 52f to be attached to either mounting bracket 78 or mounting bracket 79. Finally, jumper hose 96g permits drop nozzle 52g to be attached to mounting bracket 80 or to another mounting bracket not shown in the figure.

Referring to FIG. 2, there is shown a partial perspective view of drop nozzle 52a and the manner in which it is attached to the lower support bar 32b of the first boom outer frame and is coupled to the nozzle holder 100. Drop nozzle 52a includes an elongated, linear nozzle shaft, or tube, 88 having at its lower end first and second spray nozzles 90 and 92. Nozzle tube 88 is attached to mounting bracket 70 by means of the combination of a mounting plate 84 and a tube holder 86. Mounting bracket 70 is, in turn, securely attached to lower support bar 32b by means of a clamp 82. Details of this mounting arrangement are described below.

The upper end of nozzle tube 88 is coupled to a nozzle holder 100 by means of the combination of a first coupler 94, jumper hose 96a and a second coupler 98. Nozzle holder 100 is securely attached to lower support bar 32b by means of a second mounting bracket 102. Nozzle holder 100 is further coupled to the first outer frame tube 62 a for providing fluid from the vehicle's tank to drop nozzle 52a. In the event the lower end of nozzle tube 88 strikes an obstruction and breaks, jumper hose 96a provides isolation between the drop nozzle 52a and nozzle holder 100. This isolation between drop nozzle 52a and nozzle holder 100 prevents damage to the nozzle holder in the event nozzle tube 88 or the spray nozzles attached thereto strikes an obstruction and is damaged or breaks.

Figures 3, 4, 5:
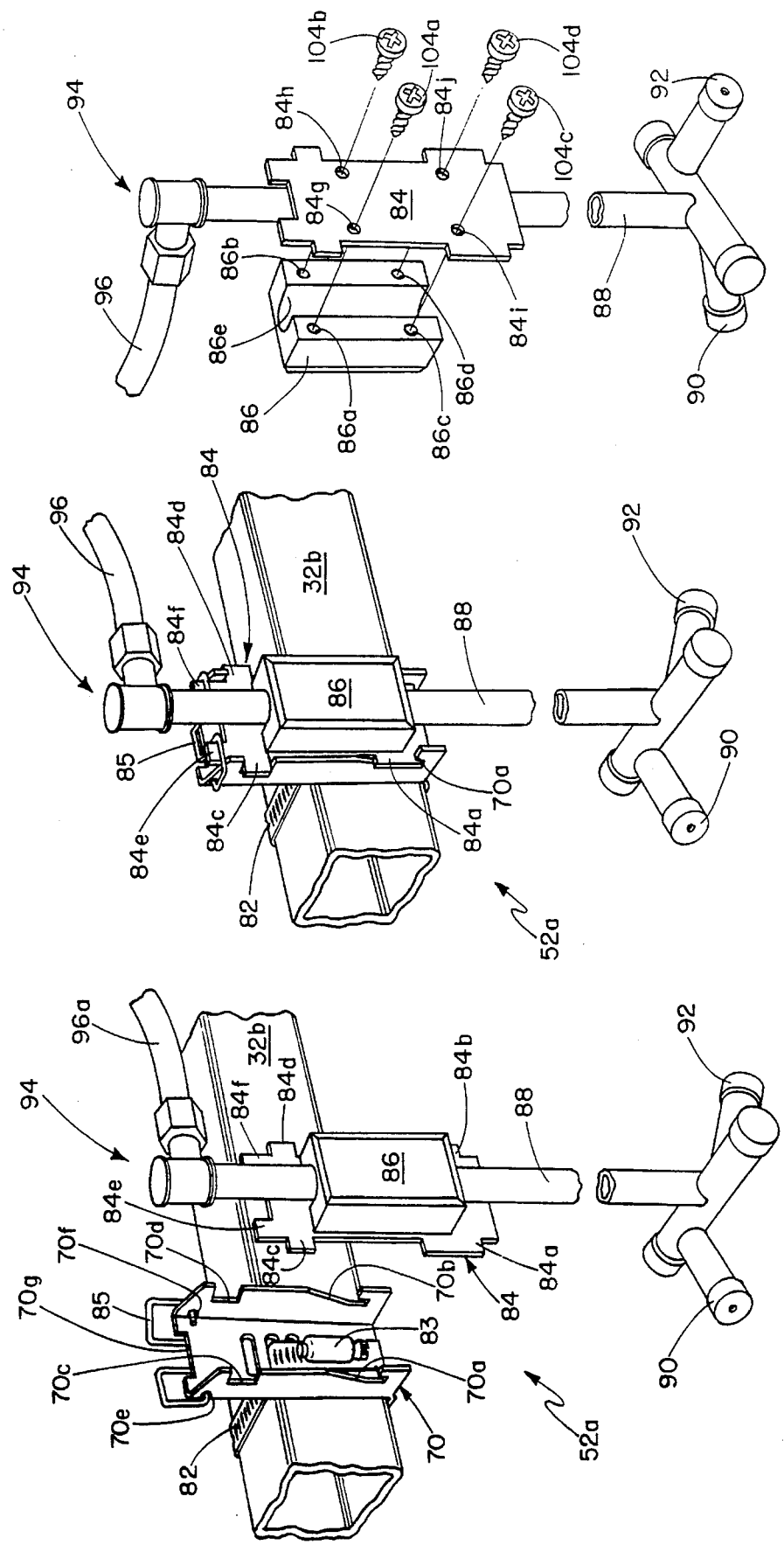
FIGS. 3 and 4 are partial perspective views respectively showing a drop nozzle detached from and attached to the boom of an agricultural sprayer unit.
FIG. 5 is an exploded perspective view of a drop nozzle assembly in accordance with the present invention.

Referring to FIG. 2 as well as to the perspective views of FIGS. 3, 4 and 5 details of the manner in which drop nozzle 52a is attached to the outer frame's lower support bar 32b will now be described. As previously described, mounting bracket 70 is securely attached to lower support bar 32b by means of clamp 82. Clamp 82 includes a threaded member 83 for tightening the clamp about lower support bar 32b while engaging mounting bracket 70. Mounting bracket 70 is attached to an aft, or trailing, surface of lower support bar 32b and includes a pair of lower recesses 70a and 70b and a pair of upper recesses 70c and 70d. Additional details of the combination of mounting bracket 70 and clamp 82 are shown in the front elevation and top plan views of FIGS. 6 and 7. Mounting plate 84 includes a pair of lower lateral projections 84a and 84b and a pair of upper lateral projections 84c and 84d. Lower projections 84a, 84b of mounting plate 84 are adapted for insertion into lower recesses 70a, 70b, respectively, in mounting bracket 70. Similarly, upper lateral projections 84c and 84d of mounting plate 84 are adapted for insertion in upper recesses 70c, 70d, respectively, of mounting bracket 70 as shown in FIG. 4.

Attached to an upper portion of mounting bracket 70 is a retaining spring 85. Respective ends of retaining spring 85 are inserted in respective apertures 70e and 70f in an upper portion of mounting bracket 70. Retaining spring 85 is movable between a generally vertical, release position shown in FIG. 3 and a generally horizontal, engaging position shown in FIGS. 4, 6 and 7. An intermediate portion of retaining spring 85 is positioned in an upper slot 70g within mounting bracket 70 when the retaining spring is positioned in a generally horizontal orientation. Retaining spring 85 is maintained under tension in either the generally upright, release position shown in FIG. 3 or the generally horizontal, engaging position shown in FIGS. 4, 6 and 7. Retaining spring 85 is securely maintained in either the vertical or horizontal position and is freely movable between these two positions by hand. As shown in FIG. 4, when retaining spring 85 is moved to the generally horizontal, engaging position, it engages a pair of spaced projections 84e and 84f on an upper end portion of mounting plate 84. With retaining spring 85 securely maintained in the generally horizontal, engaging position shown in FIG. 4, mounting plate 84 and the tube and nozzle combination attached thereto are maintained in secure engagement with mounting bracket 70 and are thus securely attached to lower support bar 32b. Nozzle tube 88 is attached to mounting plate 84 by means of tube holder 86. The details of this coupling arrangement are shown in the exploded, partial perspective view of FIG. 5. Tube holder 86 includes a plurality of threaded apertures 86a–86d on inner surfaces thereof. Tube holder 86 further includes an elongated, linear slot 86e on an inner portion thereof extending the length of the holder. Mounting plate 84 includes a plurality of spaced apertures 84g–84j. Apertures 84g, 84h, 84i and 84j are respectively adapted to receive threaded screws 104a, 104b, 104c and 104d. Apertures 86a, 86b, 86c and 86d in tube holder 86 are respectively adapted to receive screws 104a, 104b, 104c and 104d. The four screws 104a–104d draw tube holder 86 into intimate contact with mounting plate 84 for maintaining nozzle tube 88 in fixed position within the nozzle assembly. Loosening of the four screws 104a–104d allows nozzle tube 88 to be moved in a sliding manner within tube holder 86 to allow for adjusting the height above ground of the first and second spray nozzles 90, 92 on the end of the tube. In this manner, the length of the nozzle tube 88 extending below lower support bar 32b may be fixed in accordance with the height of the crop being sprayed.

There has thus been shown a drop nozzle system and holder mount therefor for use on an agricultural sprayer unit which includes a plurality of drop nozzle assemblies each attached in a spaced manner to a boom structure mounted to the sprayer unit. Each nozzle assembly is attached to the boom assembly by means of a respective mounting bracket affixed to the boom structure. Mounting brackets are arranged in a plurality of sets of mounting brackets where the spacing is fixed between each mounting bracket in a given set of mounting brackets. The mounting brackets within each set of brackets are spaced along the boom structure at predetermined, standard row intervals such as 30", 34", 36", 38", etc. The nozzle assemblies are attached to the mounting brackets by means of a quick disconnect coupling arrangement which permits each nozzle assembly to be moved to an adjacent mounting bracket on the boom structure to accommodate a change in crop inter-row spacing. The quick disconnect coupling arrangement also facilitates vertical adjustment of the individual drop nozzle assemblies depending upon crop height. Each nozzle assembly is coupled to a respective sprayer assembly fixedly attached to the boom structure by means of a jumper hose which avoids damage to the sprayer assembly in the event the drop nozzle assembly contacts an obstruction such as a rock or fence and is itself broken and also permits each nozzle assembly to be attached to two or more adjacent mounting brackets, each within a given set of such brackets.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus adapted for mounting to a boom of an agricultural sprayer and coupled via hosing to a storage tank of said sprayer for spraying row crops, said apparatus comprising:

a plurality of drop nozzle assemblies;

a plurality of mounting brackets adapted to be securely attached in a spaced manner to said boom and arranged in a plurality of sets of mounting brackets on said boom, where the spacing between adjacent mounting brackets in each set of mounting brackets corresponds with a predetermined, fixed inter-row spacing of the crops;

quick disconnect means for coupling each of said drop nozzle assemblies to the mounting brackets in respective sets of mounting brackets in accordance with the inter-row spacing of the crops being sprayed; and a plurality of jumper hoses each adapted for coupling one of said drop nozzle assemblies to said hosing for facilitating mounting of each of said drop nozzles to two or more adjacent mounting brackets each in a respective set of mounting brackets.

2. The apparatus of claim 1 further comprising a plurality of nozzle holders adapted to be mounted to said boom and coupling each of said jumper hoses to said hosing.

3. The apparatus of claim 1 wherein said quick disconnect means includes a mounting plate attached to each of said drop nozzle assemblies and a movable member attached to each of said mounting brackets for engaging and securely connecting a mounting plate to a respective mounting bracket.

4. The apparatus of claim 3 wherein said movable member comprises a spring movable between a first position for engaging said mounting plate and a second position for releasing said mounting plate.

5. The apparatus of claim 1 wherein each drop nozzle assembly includes an elongated tube having at least one spray nozzle on a lower end thereof.

6. The apparatus of claim 5 further comprising means for adjusting the length of said elongated tube extending below the boom in accordance with height of the row crops.

7. The apparatus of claim 6 wherein said means for adjusting the length of said elongated tube extending below the boom includes a tube holder engaging said elongated tube, and wherein said elongated tube is fixedly maintained in position when said elongated tube holder is tightened and wherein said elongated tube may be slid in vertical displacement within said tube holder when said tube holder is loosened.

8. The apparatus of claim 7 wherein said quick disconnect means includes a mounting plate and a resilient spring coupling each mounting plate to a respective mounting bracket.

9. The apparatus of claim 8 wherein said means for adjusting the length of said elongated tube extending below the boom includes a plurality of screws coupling said mounting plate to said nozzle holder, and wherein said elongated tube is disposed intermediate and engaged by said mounting plate and said nozzle holder.

10. A quick disconnect mounting arrangement adapted for affixing a drop nozzle assembly including an elongated tube and a spray nozzle disposed at a lower end of said tube to a boom of an agricultural sprayer vehicle, said mounting arrangement comprising:

a mounting bracket adapted to be attached to the boom;

a mounting plate adapted to be coupled to said elongated tube; and a resilient spring pivotally attached to said mounting bracket and moveable between a first position for engaging and coupling said mounting plate to said mounting bracket and a second position detached from said mounting plate for allowing release of said mounting plate and tube combination from said mounting bracket.

11. The mounting arrangement of claim 10 further comprising a tube holder attached to said mounting plate adapted for coupling said elongated tube to said mounting plate.

12. The mounting arrangement of claim 11 wherein said tube holder includes an elongated slot for receiving and engaging said tube and wherein said mounting arrangement further includes a plurality of screws for connecting said tube holder to said mounting plate and for allowing the height of the drop nozzle assembly to be changed.

13. The mounting arrangement of claim 10 further comprising means for urging said resilient spring to either said first or second positions.

14. The mounting arrangement of claim 10 wherein said mounting plate is generally planar and includes a plurality of lateral projections, and wherein said mounting bracket includes a plurality of recesses each adapted to receive and engage a respective projection of said mounting plate.

15. The mounting arrangement of claim 14 wherein said mounting plate further includes one or more upper projections adapted for engagement by said resilient spring when in said first position for securely attaching said mounting plate to said mounting bracket.

\* \* \* \* \*

UNITED STATES PATENT AND TRADEMARK OFFICE
CERTIFICATE OF CORRECTION

PATENT NO. : 5,516,044
DATED : May 14, 1996
INVENTOR(S) : ULF S. THORSTENSSON

It is certified that error appears in the above-indentified patent and that said Letters Patent is hereby corrected as shown below:

In Column 5, line 14, delete "62 a" after the word tube, and insert -- 62a --.

In column 6, line 9, delete "84" after 84h, and insert -- 84i --.

Signed and Sealed this

Tenth Day of September, 1996

BRUCE LEHMAN

Attest:

Attesting Officer    Commissioner of Patents and Trademarks